(12) United States Patent
Walter

(10) Patent No.: US 8,544,818 B2
(45) Date of Patent: Oct. 1, 2013

(54) ELECTRONIC ADAPTER FOR CONTROLLING A BISTABLE VALVE

(75) Inventor: Raimond Walter, Roethlein (DE)

(73) Assignee: Diener Precision Pumps Ltd, Embrach (CH)

( * ) Notice: Subject to any disclaimer, the term of this patent is extended or adjusted under 35 U.S.C. 154(b) by 495 days.

(21) Appl. No.: 12/693,834

(22) Filed: Jan. 26, 2010

(65) Prior Publication Data

US 2011/0089349 A1   Apr. 21, 2011

(30) Foreign Application Priority Data

Oct. 16, 2009   (EP) .................................... 09173312

(51) Int. Cl.
*F16K 31/02*   (2006.01)

(52) U.S. Cl.
USPC ................... 251/129.05; 251/129.15; 251/65; 251/69; 361/152; 361/208

(58) Field of Classification Search
USPC .............. 251/65, 69, 129.04, 129.05, 129.15; 361/152, 208
See application file for complete search history.

(56) References Cited

U.S. PATENT DOCUMENTS

| | | | | |
|---|---|---|---|---|
| 3,271,707 A * | 9/1966 | Koehler | ........................... | 335/78 |
| 3,518,497 A * | 6/1970 | Waneck et al. | ............... | 361/208 |
| 4,257,081 A * | 3/1981 | Sauer et al. | .................... | 361/156 |
| 4,366,524 A * | 12/1982 | Kuroiwa et al. | ............... | 361/154 |
| 4,385,339 A * | 5/1983 | Takada et al. | .................. | 361/154 |
| 4,455,587 A * | 6/1984 | Potthof et al. | ................. | 361/160 |
| 4,595,967 A * | 6/1986 | Potthof | .......................... | 361/152 |
| 4,609,899 A * | 9/1986 | Koehler | ......................... | 335/230 |
| 4,726,389 A * | 2/1988 | Minoura et al. | .................... | 137/1 |
| 5,247,419 A * | 9/1993 | Grundmann | ..................... | 361/94 |
| 5,884,896 A | 3/1999 | Kono et al. | | |
| 6,145,806 A * | 11/2000 | Dettmann | ........................ | 251/65 |
| 6,186,167 B1 * | 2/2001 | Grumstrup et al. | ......... | 137/487.5 |
| 6,527,248 B1 * | 3/2003 | Muller | ........................... | 251/111 |
| 7,556,238 B2 * | 7/2009 | Seberger | ......................... | 251/69 |
| 8,172,199 B2 * | 5/2012 | Ushigusa et al. | ......... | 251/129.05 |
| 2007/0241298 A1 * | 10/2007 | Herbert et al. | ........... | 251/129.04 |
| 2008/0179553 A1 | 7/2008 | Walter | | |

FOREIGN PATENT DOCUMENTS

| | | |
|---|---|---|
| EP | 2 110 820 A2 | 10/2009 |
| GB | 1 415 444 A | 11/1975 |

* cited by examiner

*Primary Examiner* — John K Fristoe, Jr.
*Assistant Examiner* — Matthew W Jellett
(74) *Attorney, Agent, or Firm* — Muncy, Geissler, Olds & Lowe, PLLC

(57) ABSTRACT

An electronic adapter and a method for controlling a bistable valve for liquid or gaseous media is provided. The valve has a first and a second stable switching state, wherein in the first switching state applying a switch voltage with a first polarity for at least a switch time period to electric terminals of the valve causes the valve to change to the second switching state and wherein in the second switching state applying a switch voltage with an opposite second polarity for at least the switch time period causes the valve to change from the second to the first switching state, wherein the adapter has at least one input connectable to a control unit and an output connectable to the terminals, wherein the adapter is arranged for outputting the switch voltage with the first polarity for at least the switch time period upon detection of a first signal event at the input and wherein the adapter is arranged for outputting the switch voltage with the second polarity for at least the switch time period upon detection of a second signal event at the input.

14 Claims, 9 Drawing Sheets

ELECTRONIC ADAPTER FOR CONTROLLING A BISTABLE VALVE

This nonprovisional application claims priority under 35 U.S.C. §119(a) to European Patent Application No. 09 173 312.1, which was filed in Germany on Oct. 16, 2009, and which is herein incorporated by reference.

BACKGROUND OF THE INVENTION

1. Field of the Invention

The invention relates to an electronic adapter and a method for controlling a bistable valve.

2. Description of the Background Art

Valves may be applied in medical technology, e.g. in dialysis machines and analyzers, and in ink jet printers or in a plurality of fields where aggressive or delicate media have to be controlled.

In most applications monostable valves are preferred over bistable ones. Monostable valves have only one stable switching state, i.e. they may be switched to an instable state, e.g. by applying a voltage to a solenoid and remain in the instable state as long as the voltage is maintained. As soon as the voltage falls below a certain level the valve drops back in its stable state. This allows for setting the valve to a defined state in case of a power failure. However, the monostable valve requires a remarkable amount of energy when being kept in its instable state. Besides the energy consumption this usually results in warming of the valve, its environment and above all warming of the medium to be controlled which may be particularly undesirable in some applications. The solenoid has to be dimensioned to cope with the permanent current feed and the resulting warming.

Bistable valves by contrast have two stable switching states. They only need a short current pulse to switch to the respective other switching state. Hence, they neither have remarkable power consumption nor do they heat the medium to be controlled. However, they do not have a default switching state in case of a power loss which keeps them from being applied in environments where this is critical. Furthermore, controlling the bistable valve is more complicated since pulses have to be generated and the polarity of the switch voltage has to be changed. Failure of the control signals, e.g. permanent current feeding of the bistable valve, which is dimensioned for pulse operation only, may result in overheating and destruction of the valve.

US 2008/0179553 A1 discloses a solenoid operated valve for controlling liquid or gaseous media, the valve comprising at least two media ports opened and closed by an armature and a solenoid with a yoke and a coil, wherein the armature consisting of a magnetisable material is movably arranged inside a valve body housing consisting of a non-magnetic material, wherein the media ports empty into the valve body housing, wherein the valve body housing is arranged between the yoke and an additional element for magnetically interacting with the armature.

SUMMARY OF THE INVENTION

It is an object of the present invention to provide an improved means and an improved method for controlling a bistable valve.

According to an embodiment of the invention, an electronic adapter for controlling a bistable valve for liquid or gaseous media is provided. The bistable valve has a first and a second stable switching state. When the bistable valve is in the first switching state applying a switch voltage with a first polarity for at least a switch time period to electric terminals of the valve causes the valve to change to the second switching state. When the bistable valve is in the second switching state applying a switch voltage with an opposite second polarity for at least the switch time period causes the valve to change from the second to the first switching state. The adapter has at least one input connectable to a control unit and an output connectable to the electric terminals of the bistable valve. The adapter is arranged for outputting the switch voltage with the first polarity for at least the switch time period upon detection of a first signal event at the input. The adapter is further arranged for outputting the switch voltage with the second polarity for at least the switch time period upon detection of a second signal event at the input.

The first signal event may be a pulse at one input and the second signal event may be a pulse at another input.

The first signal event can be a signal edge with a first slope, wherein the second signal event is a signal edge with a second, opposite slope, which is the typical way to control a monostable valve. Such an adapter may be used to apply a bistable valve in an environment where monostable behaviour is required. Existing monostable valves may be replaced by bistable valves equipped with the electronic adapter. This allows to combine the benefits of monostable valves with those of bistable ones while avoiding their respective drawbacks. In particular, the advantages can include, for example, simple control, compatible with monostable valves, defined switching state in case of power failure, less energy consumption than a monostable valve, no heating of the valve and the medium to be controlled, no heating of the environment, and/or less space requirement than a monostable valve since no over-sizing of the solenoid is required.

In an embodiment of the invention an energy store is provided for switching the valve into a defined state in case of a power failure.

When using pulses as signal events detecting the pulses actually means crossing of thresholds. Therefore the first signal event may be a voltage exceeding a first threshold and the second signal event may be a voltage falling below a second threshold. The first threshold is greater than the second threshold. A boost converter may be arranged for converting input voltages greater than the second threshold to a voltage for charging the energy store in order to achieve and/or maintain an energy store voltage at least as high as the required switch voltage.

Energy storages, in particular capacitors tend to self-discharge over time when not being recharged. When controlling monostable valves the input voltage is usually reduced to a holding level after switching to the instable state, wherein the holding level is remarkably lower than the switching voltage. However the energy store of the adapter needs to be charged to a level at least as high as the switching voltage in order to reliably switching the valve to a default switching state. Charging or maintaining simply with the input voltage at holding level is insufficient. Instead, a boost converter is used for converting the input voltage at holding level into a voltage high enough to charge the energy store or maintain its charge. Boost converters usually chop a DC voltage and apply the resulting pulsed voltage to an inductor where voltage peaks at much higher level are induced. These voltage peaks may then be used for charging an energy store such as a capacitor. The energy store voltage may therefore be remarkably higher than the initial DC voltage. This allows for reliably switching the valve into its default switching state even after a long-term input voltage at holding level.

The valve typically comprises a solenoid with a yoke and a coil. The coil can be connectable to the electric terminals. The inductance of the coil may be used as part of the boost converter for converting the voltage. Thus, an extra inductor is not needed. The boost converter is arranged for applying an alternating or pulsed voltage to the coil when the input voltage is greater than the second threshold and smaller than the first threshold, e.g. at holding level.

The alternating voltage may have a cycle period smaller than twice the switch time period. This avoids unintentional switching of the valve by the pulsed voltage since its pulses are too short to switch the switching states.

Unintentional switching may also be avoided by keeping the amplitude of the alternating voltage smaller than the switch voltage.

The valve may comprise an armature consisting of a magnetisable material, moveably arranged inside a valve body housing consisting of a non-magnetic material. An inductivity of the coil may be influenced by a position of the armature since an air gap between the armature and the yoke is different between the two stable positions corresponding to the switching states. A sensor winding may be arranged on the yoke for detecting the switching state from a sensor voltage induced in the sensor winding by a magnetic flux of the solenoid caused by the alternating voltage. Thus the current switching state or position can be detected without much effort.

In an alternative embodiment the position or switching state may be detected by means of a Hall sensor or an optoelectronic coupler. The current position may be indicated by an LED or another display means.

The electronic adapter may be arranged as an integrated circuit, e.g. a customized integrated circuit in order to reduce space requirement and costs.

The adapter may be integrated in the bistable valve or externally attached to it. Alternatively the adapter may be integrated into the control unit.

The adapter may be applied with a bistable valve as disclosed in US 2008/0179553 A1, which is included by reference herein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Corresponding parts are marked with the same reference symbols in all figures.

Figure 1:
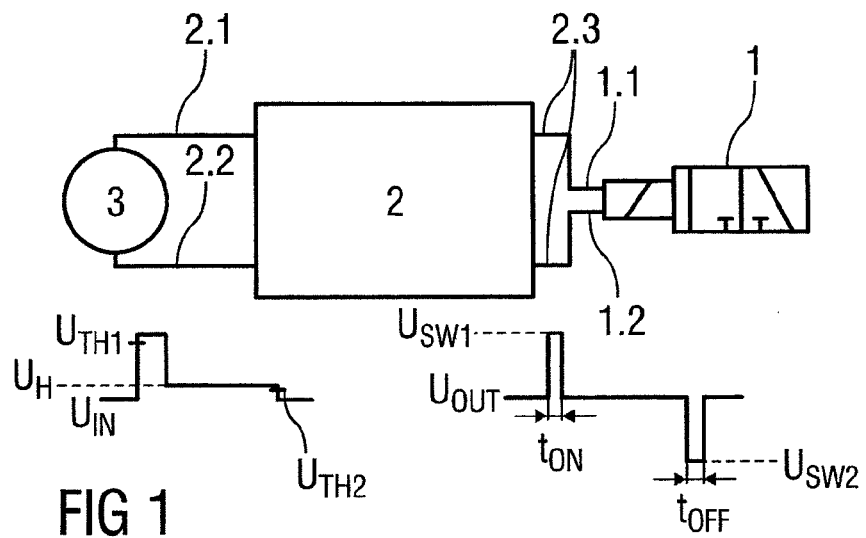
FIG. 1 is a schematic view of a bistable valve for controlling liquid or gasiform media with an electronic adapter for converting control signals.

FIG. 1 is a schematic view of a bistable valve 1 for controlling liquid or gasiform media with an electronic adapter 2 for converting control signals. The bistable valve 1 has a first and a second stable switching state. The valve is operated by applying respective switch voltages $U_{SW1}$, $U_{SW2}$ with opposite polarities for at least a switch time period $t_{ON}$, $t_{OFF}$ at electric terminals 1.1, 1.2 of the valve 1. If the valve 1 is in the first switching state, applying the switch voltage $U_{SW1}$ with a first polarity for at least the switch time period $t_{ON}$, $t_{OFF}$ to the electric terminals 1.1, 1.2 causes the valve to change to the second switching state. If the valve 1 is in the second switching state, applying the switch voltage $U_{SW2}$ with an opposite second polarity for at least the switch time period $t_{ON}$, $t_{OFF}$ causes the valve 1 to change from the second to the first switching state. The electronic adapter 2 allows applying the bistable valve 1 in environments that require valves with monostable behaviour while benefiting from the typical characteristics of the bistable valve 1. The electronic adapter 2 is therefore designed to accept control signals for a monostable valve at its input 1.1, 1.2 and converts the signals in a manner to drive the bistable valve 1 accordingly.

A monostable valve is usually operated by an input voltage $U_{IN}$ in the depicted manner. Raising the input valve above a first threshold $U_{TH1}$ for a certain time period causes a solenoid in a monostable valve to magnetically attract an armature, i.e. the first or second switching state. The armature can then be held in this position by a remarkably lower holding level voltage $U_H$ after having been switched. Dropping the input voltage $U_{IN}$ below an even lower second threshold $U_{TH2}$ causes the armature to drop out, i.e. the respective other second or first switching state, which is the only stable state of the monostable valve.

In order to convert the signals for the monostable valve in a manner to have a bistable valve 1 react in the same way the electronic adapter 2 has the following characteristics:

The electronic adapter 2 has at least one input 2.1, 2.2 connectable to a control unit 3 and an output 2.3 connectable to the terminals 1.1, 1.2. The electronic adapter 2 is arranged for outputting the switch voltage $U_{SW1}$ with the first polarity for at least the switch time period $t_{ON}$, $t_{OFF}$ upon detection of a first signal event at the input 2.1, 2.2, which is the input voltage $U_{IN}$ exceeding the first threshold $U_{TH1}$. The electronic adapter 2 may ignore the subsequent drop of the input voltage $U_{IN}$ to the holding level voltage $U_H$. The electronic adapter 2 is further arranged for outputting the switch voltage $U_{SW2}$ with the second polarity for at least the switch time period $t_{ON}$, $t_{OFF}$ upon detection of a second signal event at the input 2.1, 2.2, which is the input voltage $U_{IN}$ falling below the second threshold $U_{TH2}$.

The following values are sample values for the dimensioning of the electronic adapter 2 and the valve 1. All values may be changed adequately.

Figure 2:
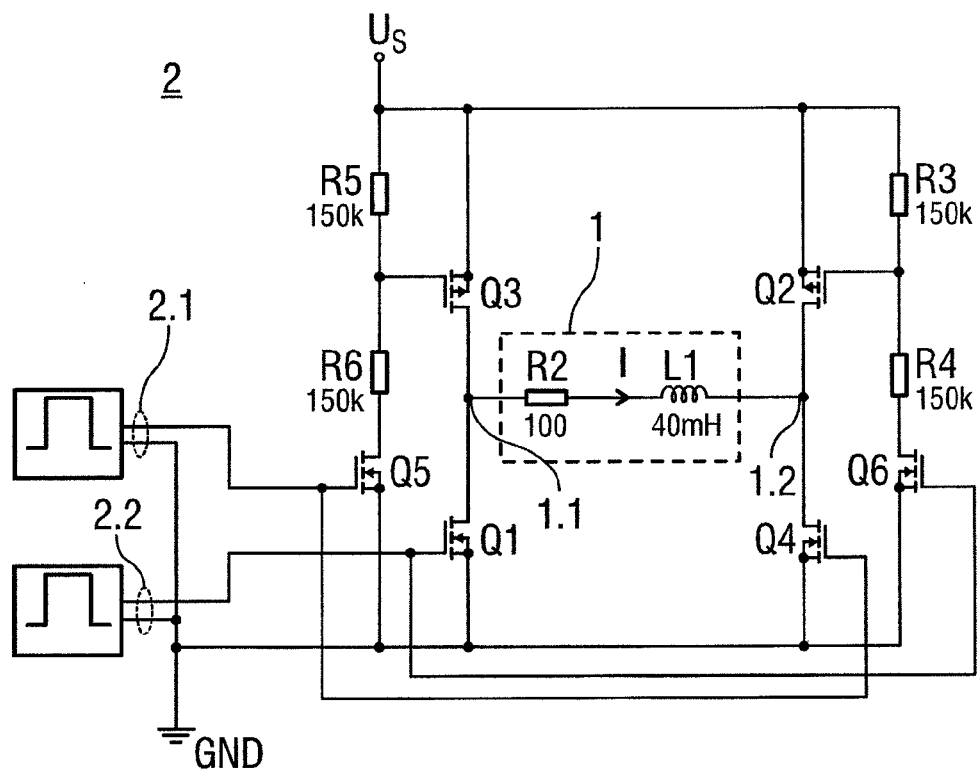
FIG. 2 is a circuit diagram of the electronic adapter for controlling the bistable valve.

Switching voltages $U_{SW1}$, $U_{SW2}$ for a solenoid with an inductance of 125 mH and a resistance of 60 Ohm: 15 V
First threshold $U_{TH1}$: 12 V
Second threshold $U_{TH2}$: 3 V
Maximum input voltage $U_{IN\_max}$: 24 V
Switch time period $t_{ON}$, $t_{OFF}$: minimum 5 ms, typical 10 ms
Maximum switch current pulse: 500 mA FIG. 2 is a circuit diagram of the electronic adapter 2 for controlling the bistable valve 1. The electronic adapter 2 has two inputs 2.1, 2.2, one of them used for switching the valve 1 from the first to the second switching state and the other one used for switching the valve 1 the other way round from the second to the first switching state. The inductor L1 and the resistor R2 are characteristics of the solenoid of the bistable valve 1. The electronic adapter 2 is fed a supply voltage $U_S$, e.g. 24 V. The electronic adapter 2 is arranged to be controlled by TTL level signals, i.e. the inputs 2.1, 2.2 are either at about 0 V (low) or about 5 V (high). The electronic adapter 2 may likewise be operated with other signal levels when accordingly adapted. When both inputs 2.1, 2.2 are at low level the electric terminals 1.1, 1.2 are both at a high impedance level with respect to the supply voltage $U_S$ since none of the switches Q1, Q2, Q3, Q4 is closed.

Figure 3:
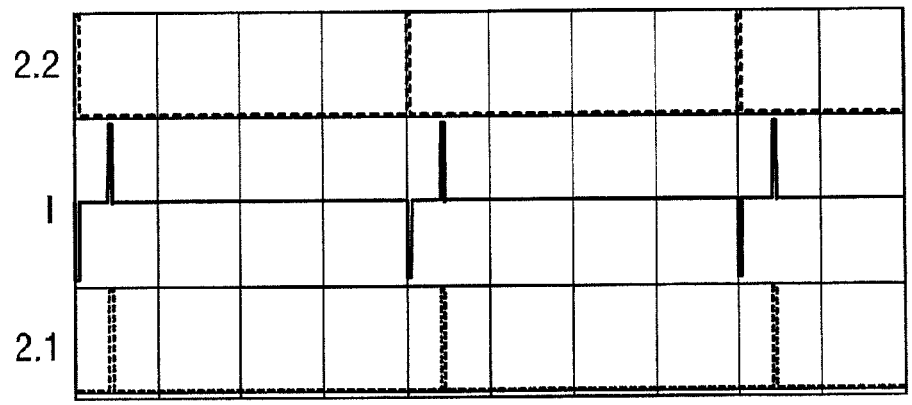
FIG. 3 is a timing diagram of input and output signals of the electronic adapter of FIG. 2.

FIG. 3 shows a timing diagram of input and output signals of the electronic adapter 2 of FIG. 2.

When the input 2.1 is pulled to high level the switches Q5, Q3 and Q4 are closed. Consequently the electric terminal 1.1 is connected to the supply voltage Us and the electric terminal 1.2 to ground GND resulting in a current I through the solenoid.

When the input 2.2 is pulled to high level the switches Q1, Q6 and Q2 are closed. Consequently the electric terminal 1.2 is connected to the supply voltage $U_S$ and the electric terminal 1.1 to ground GND resulting in a negative current –I through the solenoid.

Figure 4:
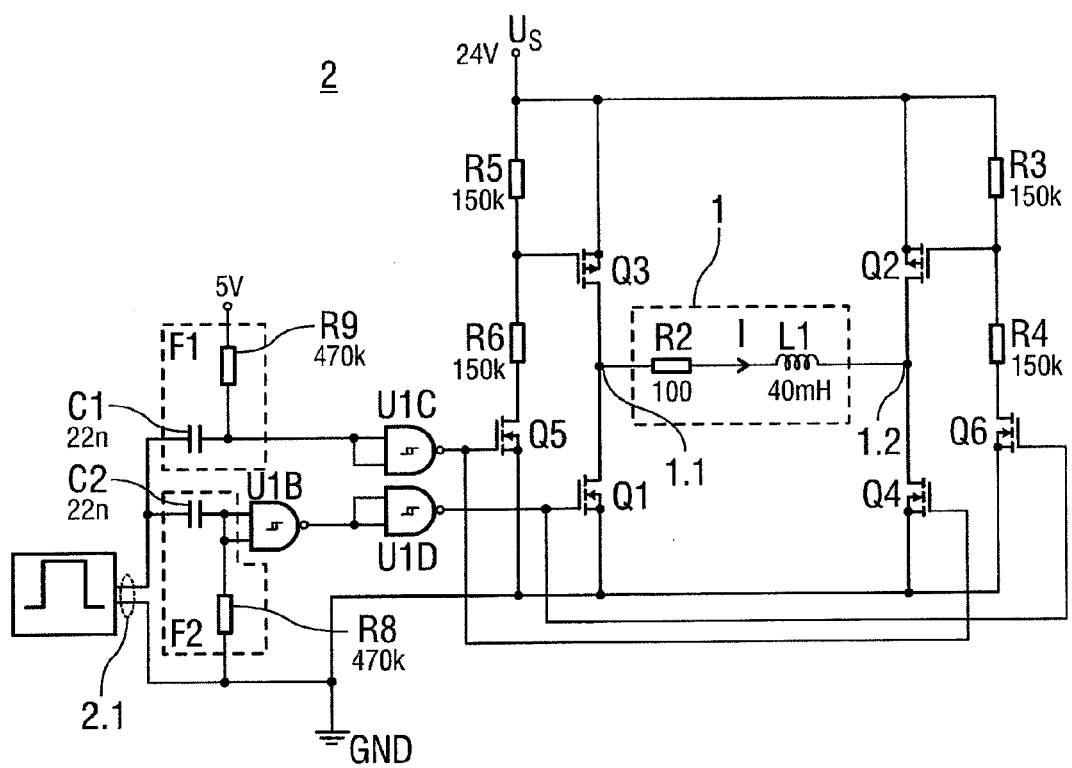
FIG. 4 is another embodiment of the electronic adapter.
Figure 5:
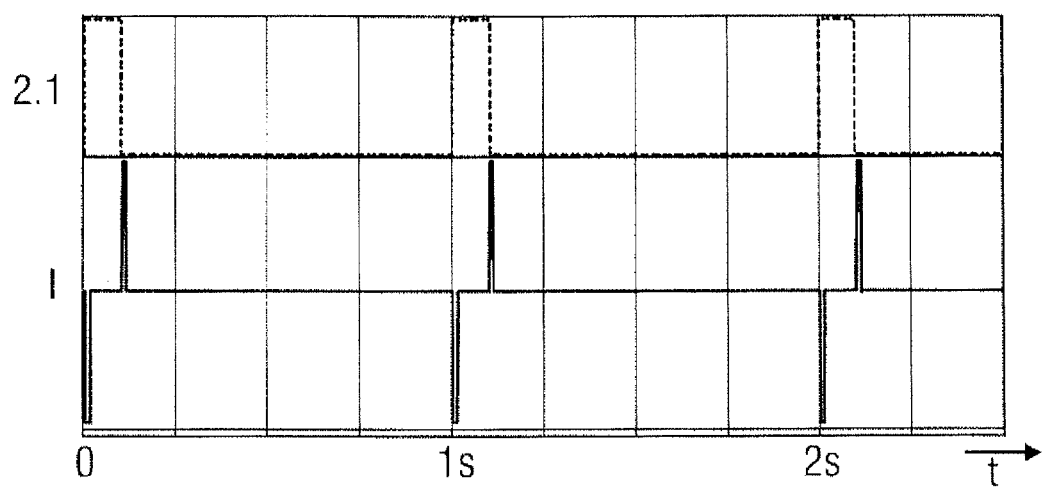
FIG. 5 is a timing diagram of input and output signals of the electronic adapter of FIG. 4.

FIG. 4 shows another embodiment of the electronic adapter 2. FIG. 5 is the corresponding timing diagram. The adapter 2 of FIG. 4 is an enhanced version of the adapter 2 of FIG. 2. The adapter 2 has only one input 2.1. The input 2.1 is connected to a circuit portion consisting of two high-pass filters F1, F2 and NAND gates U1B, U1C, U1D acting as Schmitt triggers. Thus the switches Q1 to Q6 may be operated upon detection of signal edges of the input signal rather than signal levels as in FIG. 2. This avoids illegal states which can happen in FIG. 2 when both input signals are pulled to high level.

When the input 2.1 is switched from low level to high level the input of the NAND gate U1B is pulled from low to high level via the capacitor C2 of the high-pass filter F2. Hence the output of the NAND gate U1B switches from high to low. This signal is inverted by the subsequent NAND gate U1D so the input of the switches Q1 and Q6 is switched to high level resulting in the switches Q1, Q6 and Q2 getting closed. Consequently the electric terminal 1.2 is connected to the supply voltage $U_S$ and the electric terminal 1.1 to ground GND resulting in a negative current –I through the solenoid. After a time period depending on the RC time constant of the high pass filter F2 the capacitor C2 is charged above a certain level. Hence the voltage at the input of the NAND gate U1B falls below a threshold resulting in the switches Q1, Q6 and Q2 getting opened so the switch voltage is no longer applied to the electric terminals 1.1, 1.2.

When the input 2.1 is switched from high level to low level the input of the NAND gate U1C is pulled from high to low level via the capacitor C1 of the high-pass filter F1. Hence the output of the NAND gate U1C switches from low to high so the input of the switches Q5 and Q4 is switched to high level resulting in the switches Q5, Q4 and Q3 getting closed. Consequently the electric terminal 1.1 is connected to the supply voltage $U_S$ and the electric terminal 1.2 to ground GND resulting in a positive current I through the solenoid. After a time period depending on the RC time constant of the high pass filter F1 the capacitor C1 is charged above a certain level. Hence the voltage at the input of the NAND gate U1B exceeds a threshold resulting in the switches Q5, Q4 and Q3 getting opened so the switch voltage is no longer applied to the electric terminals 1.1, 1.2.

Figure 6:
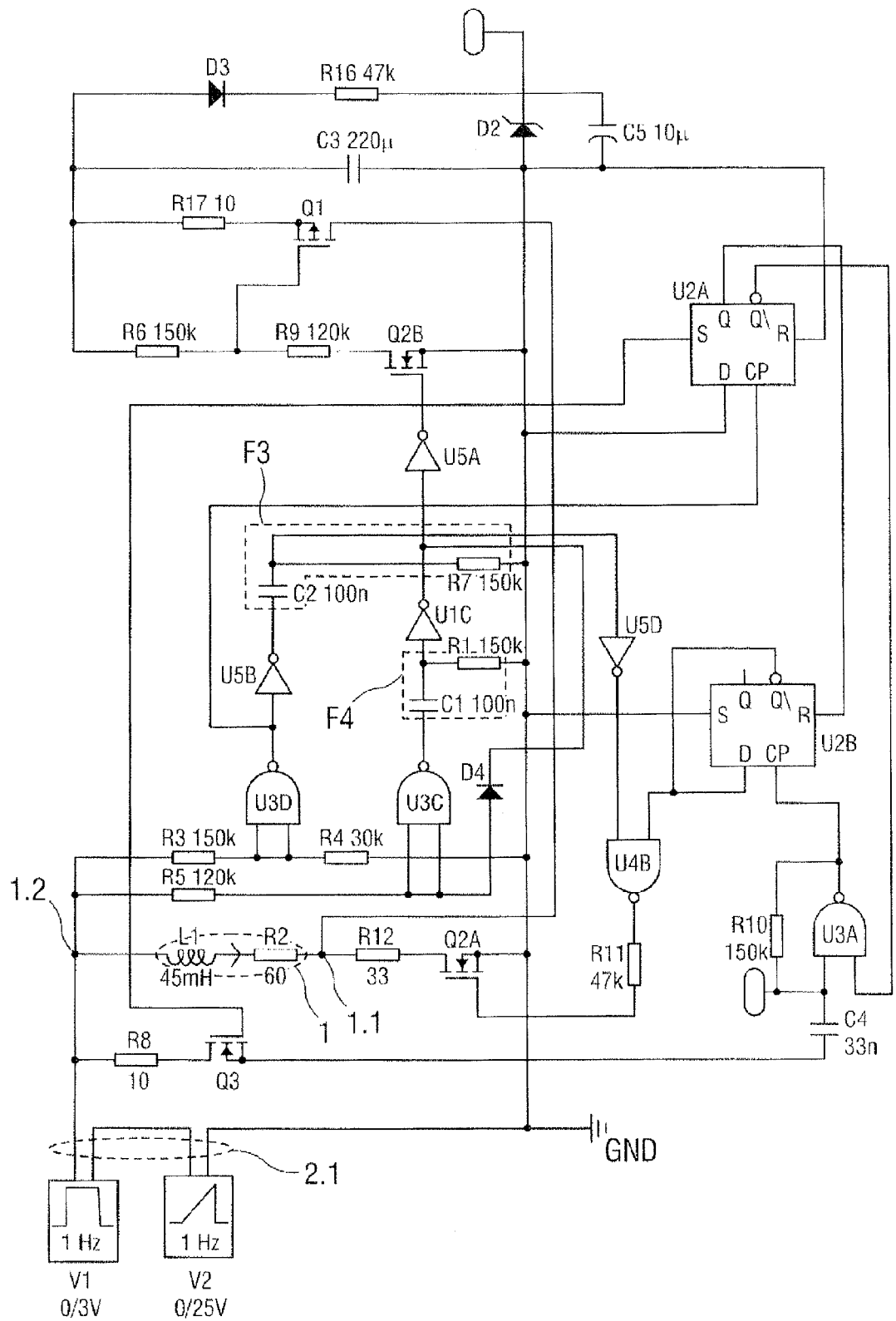
FIG. 6 is yet another embodiment of the electronic adapter with an energy store for ensuring a defined switching state of the valve in case of a power failure.
Figure 7:
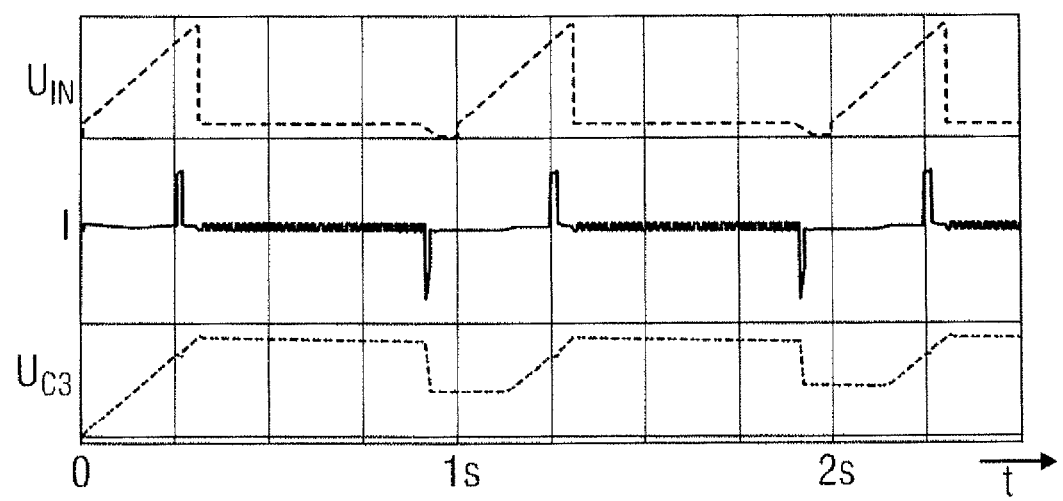
FIG. 7 is a timing diagram of input and output signals of the electronic adapter of FIG. 6.

FIG. 6 shows yet another embodiment of the electronic adapter 2 with an energy store for ensuring a defined switching state of the valve in case of a power failure. FIG. 7 is the corresponding timing diagram. In order to allow the bistable valve 1 to be reliably switched into a default switching state when controlled by a control unit 3 intended for monostable valves, the electronic adapter 2 is equipped with an energy store. In the present example the energy store is arranged as a capacitor C3. The energy store may be charged during the short voltage peak exceeding the first threshold $U_{TH1}$ (cf. FIG. 1). However the input voltage $U_{IN}$ may then be reduced to the holding level $U_H$. If the valve 1 is held in this position for a long time, e.g. several days, the energy store will usually self-discharge so its voltage may fall below a level required for switching the valve into the respective other switching state when the input voltage $U_{IN}$ drops below the holding level $U_H$. The circuit diagram shown in FIG. 6 overcomes that problem.

The current pulses required for switching the valve 1 are achieved by means of the NAND gates U3C, U3D acting as Schmitt triggers. The RC filters F3 and F4 ensure pulse lengths of at least 10 ms in order to make them at least as long as the switch time period $t_{ON}$, $t_{OFF}$. These pulses are used to close the switch Q2A when the input voltage $U_{IN}$ exceeds the first threshold $U_{TH1}$, e.g. 18 V and to close the switch Q2B when the input voltage $U_{IN}$ falls below the second threshold $U_{TH2}$, e.g. 3 V. A CMOS supply voltage for an integrated circuit which the D flip-flops U2A, U2B are part of is generated by the charge retention circuit comprising the capacitors C3, C5, the diodes D2, D3 and the resistor R16. The energy store, i.e. the capacitor C3 is charged by the input voltage $U_{IN}$ when exceeding the first threshold $U_{TH1}$ (18 V). When the input voltage $U_{IN}$ is at holding level $U_H$ the switch Q2A is switched in a chopper mode in a manner to induce an alternating or pulsed voltage in the inductor L1 of the solenoid, wherein the induced voltage is high enough to charge the capacitor C3 and the pulses short enough to avoid the valve being switched. The switches Q1 and Q3 are closed at the same time when the input voltage $U_{IN}$ falls below the holding voltage $U_H$ so the voltage $U_{C3}$ stored in the energy store C3 causes a negative current –I through the solenoid.

The following values are sample values for the dimensioning of the electronic adapter 2 and the valve 1. All values may be changed adequately.
Resistance R1 of the solenoid: 60 Ohm
Inductivity L1 of the solenoid at 1 kHz: ~40 mH
Minimum pulse switching voltage $U_{SW1}$, $U_{SW2}$ at 10 ms: >10 V
Minimum pulse switching current I: >167 mA
Minimum switching work $(10V)^2 \times 10$ ms/60 Ohm: >16.7 mWs
First threshold $U_{TH1}$ (pulsed): 18V Pulse switching current: 300 mA
Switching work $(18V)^2 \times 10$ ms/60 Ohm: 54 mWs
Energy store capacity (switching work/$(U_{TH1})^2$): >157 μF
Chosen capacitor: 220 μF The switches Q1 to Q6, Q2A, Q2B are arranged as field-effect transistors, particularly MOSFETs. However, they may also be implemented by different components.

Figure 8:
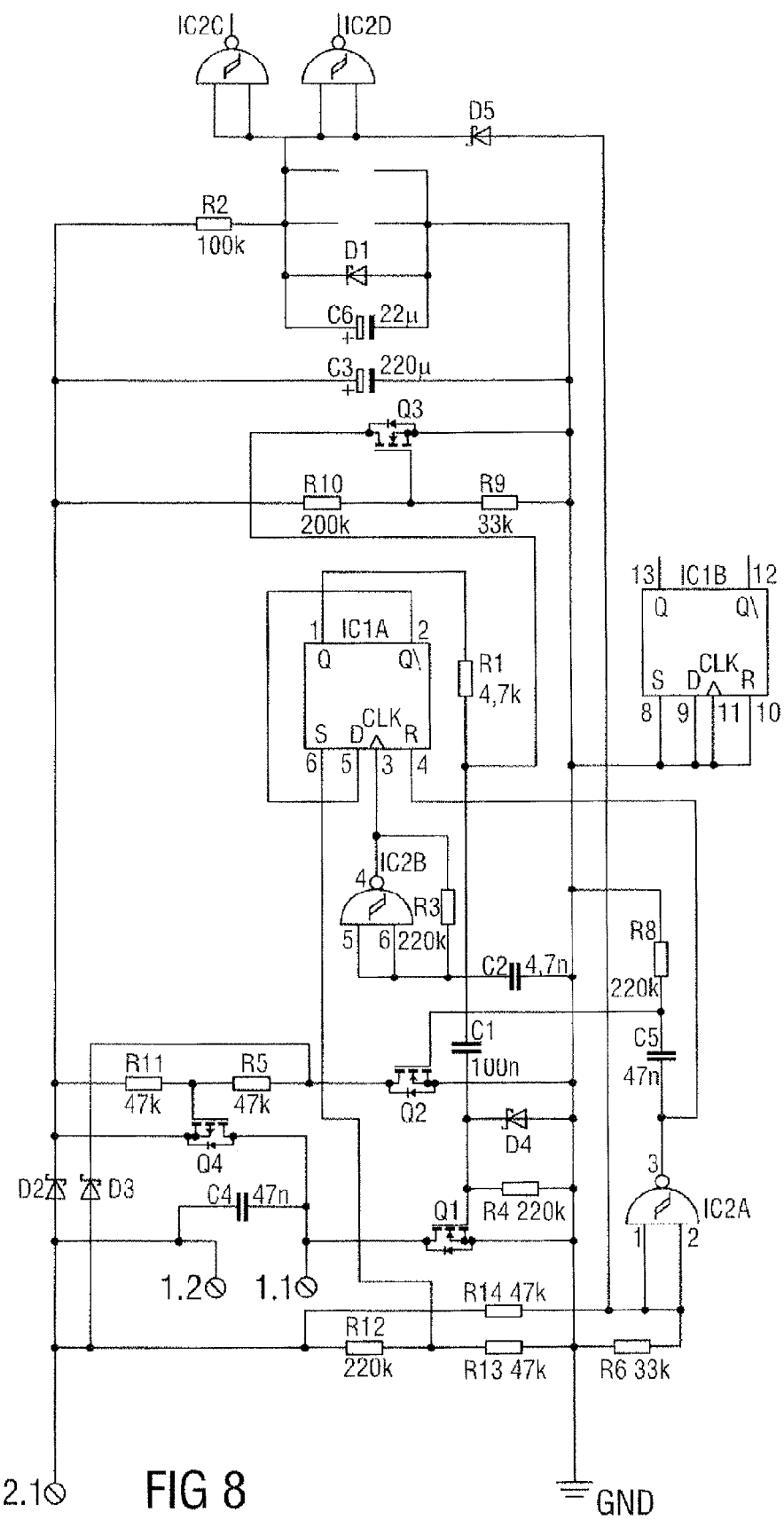
FIG. 8 is yet another embodiment of the electronic adapter with an energy storage.
Figure 9:
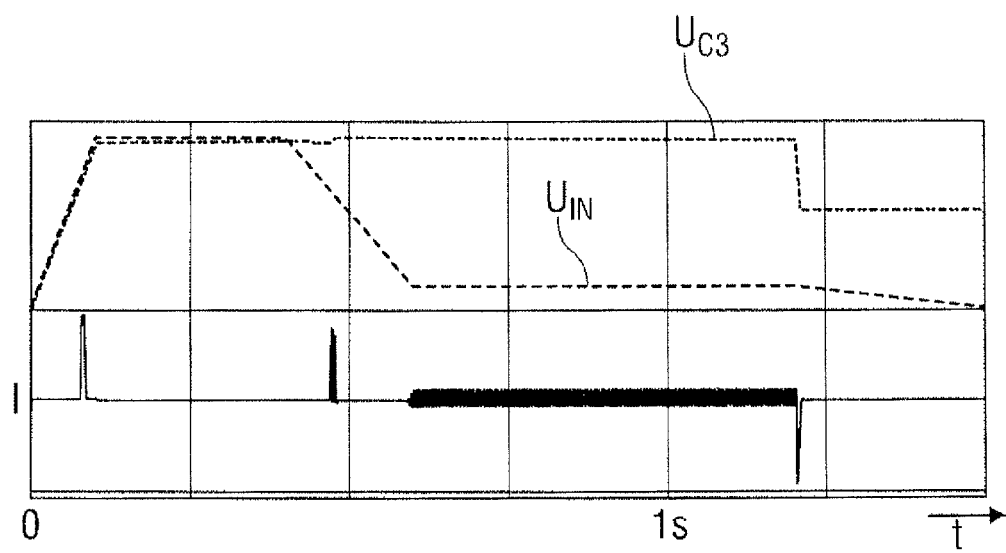
FIG. 9 is a timing diagram of input and output signals of the electronic adapter of FIG. 8.

FIG. 8 shows yet another embodiment of the electronic adapter 2 with an energy store for ensuring a defined switching state of the valve in case of a power failure. FIG. 9 is the corresponding timing diagram. A clock generator, comprising the flip-flops IC1A, IC1B generates the positive current pulse ($t_{ON}$=10 ms) and the chopper signals for maintaining the charge of the energy store C3 by controlling the switch Q1. A voltage divider consisting of the resistors R9, R10 at the gate of the switch Q3 adjusts the amplitude of the voltage at the energy store (capacitor) C3 to about 23 V. A voltage divider consisting of the resistors R12, R13 determines the first threshold $U_{TH1}$ for generating the positive current pulse through the solenoid. Another voltage divider consisting of R6, R14 determines the second threshold $U_{TH2}$ for triggering the negative current pulse through the solenoid. The electronic adapter 2 may be tailored to different control signals by appropriately adjusting these voltage dividers.

The dimensioning of the components used in the circuit diagrams may differ from the examples shown in the figures. Particularly, the capacity of the energy store C3 may be reduced corresponding to the requirements of the respective bistable valve 1 since this capacitor C3 is the component with the highest space requirement.

In the examples the switch time periods $t_{ON}$ and $t_{OFF}$ are equal as well as the first and second switching voltages $U_{SW1}$, $U_{SW2}$. However they may be different in some embodiments.

Figure 10A:
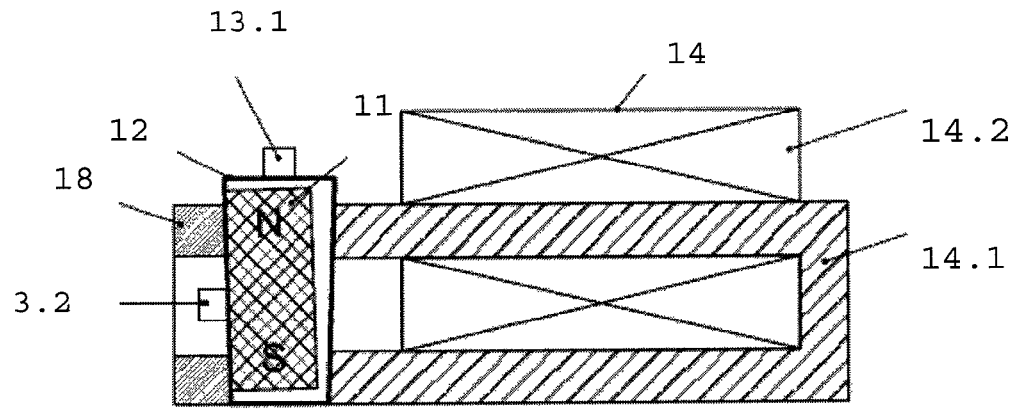
FIG. 10 illustrates a bistable embodiment of the solenoid operated valve of the 2/2-way type.
Figure 10B:
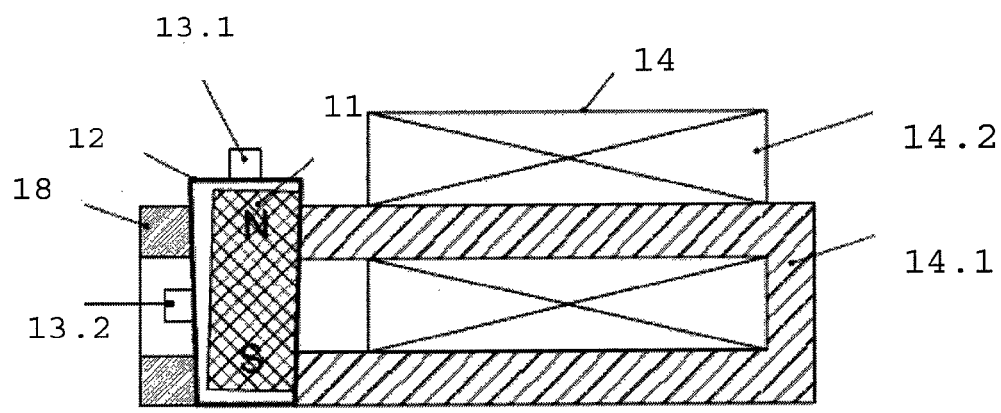

FIG. 10 shows an embodiment of the valve of the 2/2-way bistable type. Here the armature 11 includes a permanent magnet with north pole N and the south pole S. As in the monostable embodiments described above a solenoid 14 is situated on one side of the valve body housing 12. A ferromagnetic additional element 18 is arranged on the opposite side. In the position shown in FIG. 10a the armature 11 seals the left media port 13.2. The permanently magnetic armature 11 forms a magnetic circuit with the ferromagnetic additional element 18 and the interjacent air gaps and remains stably in this position. When a current pulse flows through the solenoid 14 the induced electromagnetic flux causes the armature 11 to perform a tilting movement towards the solenoid 14. This state is shown in FIG. 10b. The armature 11 remains in this position even when the solenoid is dead since the magnetic flux induced by the permanently magnetic armature 11 is closed by the yoke 14.1 of the solenoid 14 thus causing to magnetic attraction forces between the armature 11 and the yoke 14.1. If the solenoid 14 is subjected to a current pulse in opposite direction the armature 11 is repelled from the yoke 14.1 and tilts back in the position shown in FIG. 10a.

Figure 11:
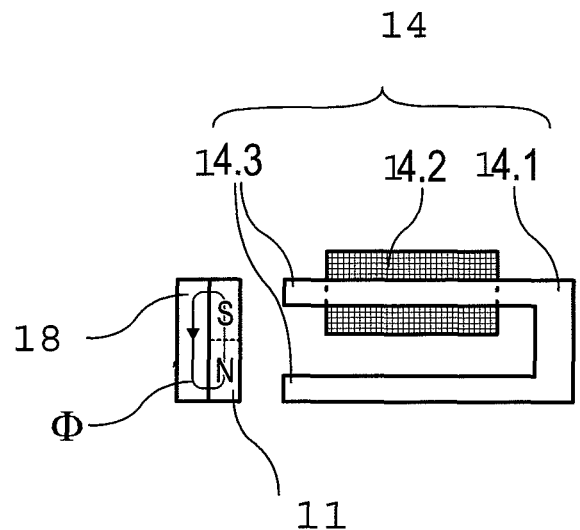
FIG. 11 illustrates a bistable embodiment of the solenoid operated valve, comprising a solenoid with a U-shaped yoke, whose both yoke poles interact with an armature, the armature in a first position shifted towards an additional element.

FIG. 11 shows a bistable embodiment of the solenoid operated valve, the valve comprising a solenoid 14 with a coil 14.2 and a U-shaped yoke 14.1. The yoke comprises two yoke poles 14.3 interacting with the armature 11. The armature 11 is shown in a first position tilted towards an additional element which is constructed as a ferromagnetic additional element 18 here. E.g. the ferromagnetic additional element 18 may include iron. The armature 11 is designed permanently magnetic with a north pole N and a south pole S. A magnetic flux φ is effective between the armature 11 and the ferromagnetic additional element 18. The armature 11 remains in the first position shown when the coil 14.2 is dead since the magnetic flux φ is closed by the ferromagnetic additional element 18 here.

Figure 12:
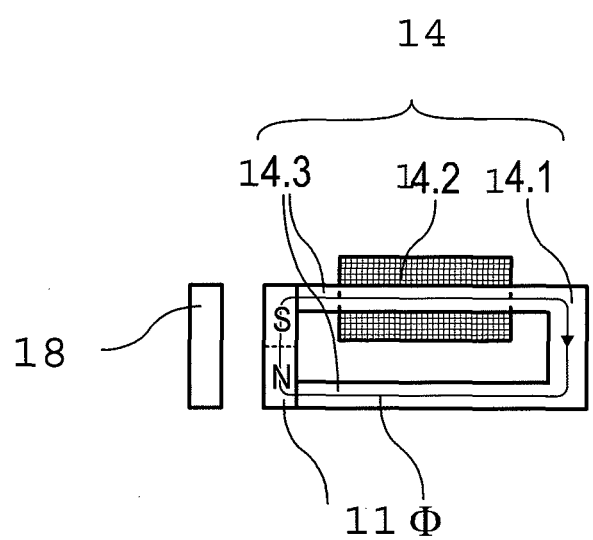
FIG. 12 illustrates the valve from FIG. 11 in a second position, wherein the armature is shifted towards the yoke.

FIG. 12 shows the valve from FIG. 11 in a second position with the armature 11 shifted towards the yoke 14.1. By feeding the coil 14.2 a current in the position shown in FIG. 11 the armature 11 is attracted by both yoke poles 14.3 and switched into the second position. Once it has taken this position further current feeding of the coil 14.2 is not required since the magnetic flux φ between the yoke 14.1 and the armature 11 is effective even without current feeding causing the armature 11 to remain in the second position. For switching back into the first position another short termed current feed of the coil 14.2 is required leading to a repellent effect between the armature 11 and the yoke 14.1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electronic adapter configured to control a bistable valve for a liquid or gaseous media, the valve having a first and a second stable switching state, wherein in the first switching state a first switch voltage is applied with a first polarity for at least a switch time period to electric terminals of the valve thereby causing the valve to change to a second switching state and wherein in the second switching state a second switch voltage is applied with an opposite second polarity for at least the switch time period to thereby cause the valve to change from the second switching state to the first switching state, the electronic adapter comprising:
   only one input connectable to a control unit; and
   an output connectable to the electric terminals,
   wherein the adapter is configured to output the first switch voltage with the first polarity for at least the switch time period upon detection of a first signal event at the input, and
   wherein the adapter is configured to output the second switch voltage with the second polarity for at least the switch time period upon detection of a second signal event at the input, and
   wherein an energy store is provided for switching the valve into a defined state in case of a power failure.

2. The electronic adapter according to claim 1, wherein the first signal event is a pulse at one input and wherein the second signal event is a pulse at another input.

3. The electronic adapter according to claim 1, wherein the first signal event is a signal edge with a first slope, and wherein the second signal event is a signal edge with a second slope that is opposite the first slope.

4. The electronic adapter according to claim 1, wherein the first signal event is an input voltage exceeding a first threshold, wherein the second signal event is an input voltage falling below a second threshold, wherein the first threshold is greater than the second threshold, and wherein a boost converter is arranged for converting input voltages greater than the second threshold to a voltage for charging the energy store in order to achieve and/or maintain an energy store voltage at least as high as the switch voltage.

5. The electronic adapter according to claim 4, wherein the valve comprises a solenoid with a yoke and a coil, wherein the coil is connectable to the electric terminals, wherein the coil is used as part of the boost converter for converting the voltage, and wherein the boost converter is arranged for applying an alternating voltage to the coil when the input voltage is greater than the second threshold and smaller than the first threshold.

6. The electronic adapter according to claim 5, wherein the alternating voltage has a cycle period smaller than twice the switch time period.

7. The electronic adapter according to claim 5, wherein the alternating voltage has an amplitude smaller than the first switch voltage and the second switch voltage.

8. A method for controlling a bistable valve for liquid or gaseous media, the valve having a first and a second stable switching state, wherein in the first switching state a first switch voltage is applied with a first polarity for at least a switch time period to electric terminals of the valve thereby causing the valve to change to the second switching state and wherein in the second switching state a second switch voltage is applied with an opposite second polarity for at least the switch time period thereby causing the valve to change from the second to the first switching state, wherein the method comprises:
applying the first switch voltage with the first polarity for at least the switch time period upon detection of a first signal event at an input of an adapter arrangement wherein the adapter includes only one input; and
applying the second switch voltage with the second polarity for at least the switch time period upon detection of a second signal event at the input,
wherein an energy store is provided for switching the valve into a defined state in case of a power failure.

9. The method according to claim 8, wherein the first signal event is a pulse at one input, and wherein the second signal event is a pulse at another input.

10. The method according to claim 8, wherein the first signal event is a signal edge with a first slope, and wherein the second signal event is a signal edge with a second, opposite slope.

11. The method according to claim 8, wherein the first signal event is an input voltage exceeding a first threshold, wherein the second signal event is an input voltage falling below a second threshold, wherein the first threshold is greater than the second threshold, and wherein input voltages greater than the second threshold are converted by a boost converter to a voltage for charging an energy store in order to achieve and/or maintain an energy store voltage at least as high as the switch voltage.

12. The method according to claim 11, wherein a coil of a solenoid of the bistable valve is used as part of the boost converter for converting the voltage, and wherein an alternating voltage is applied by the boost converter to the coil when the input voltage is greater than the second threshold and smaller than the first threshold.

13. The method according to claim 12, wherein the alternating voltage has a cycle period smaller than twice the switch time period and/or an amplitude smaller than the first switch voltage and the second switch voltage.

14. The electronic adapter according to claim 1, wherein the electronic adapter is devoid of an input for a supply voltage.

* * * * *